United States Patent [19]

Taylor

[11] 3,949,646

[45] Apr. 13, 1976

[54] CONTROL DEVICE FOR AIR CYLINDER UNIT

[75] Inventor: George W. B. Taylor, Richmond, Va.

[73] Assignee: Philip Morris Incorporated, New York, N.Y.

[22] Filed: July 26, 1974

[21] Appl. No.: 492,156

[52] U.S. Cl. ................. 91/461; 91/51; 137/625.63; 137/625.64; 137/625.66

[51] Int. Cl.[2] F15B 11/15; F15B 13/043; F16K 11/06

[58] Field of Search..... 137/625.66, 625.63, 625.64; 91/461, 304, 51, 356

[56] References Cited

UNITED STATES PATENTS

| | | | |
|---|---|---|---|
| 2,641,229 | 6/1953 | Bellows | 91/422 |
| 2,846,981 | 8/1958 | Kambic | 91/461 |
| 2,847,879 | 8/1958 | Olson et al. | 91/461 |
| 3,318,332 | 5/1967 | Lansky et al. | 137/625.64 |
| 3,461,909 | 8/1969 | Vohringer | 137/625.64 X |

*Primary Examiner*—Irwin C. Cohen
*Attorney, Agent, or Firm*—Watson Leavenworth Kelton & Taggart

[57] ABSTRACT

There is disclosed a control device for an air cylinder unit which functions to automatically orient the unit to retract if all air is shut off to the unit during the extension operation thereof. The device includes a control piston having a first passage connecting supply pressure to only one side thereof and a second restricted passage intercommunicating opposite sides thereof.

6 Claims, 5 Drawing Figures

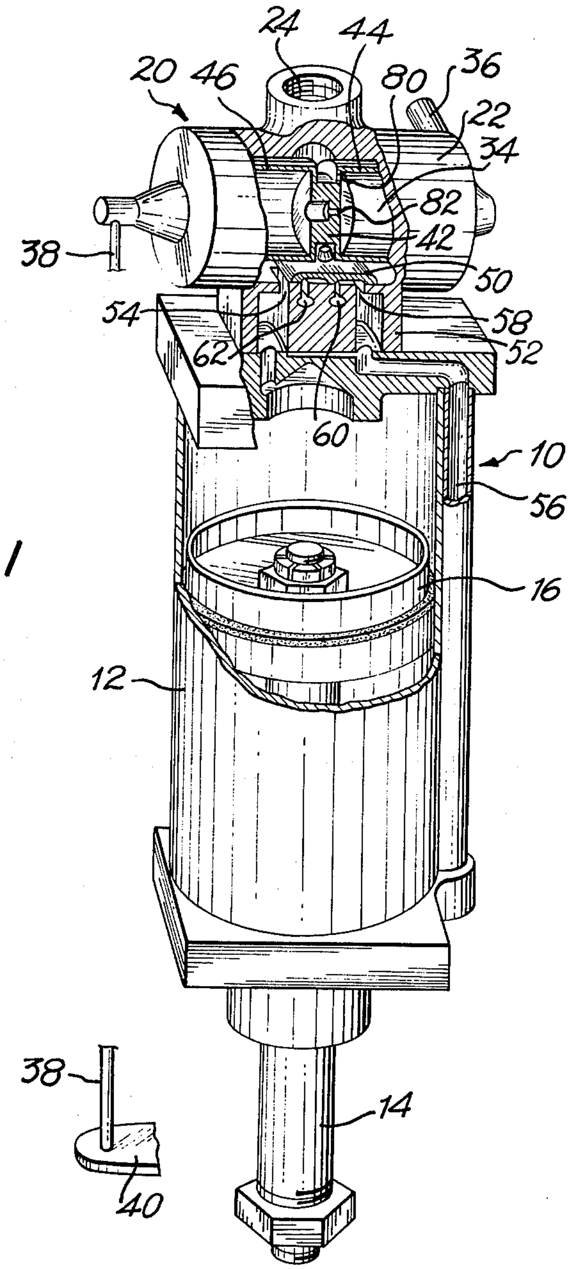
FIG. 1
FIG. 4
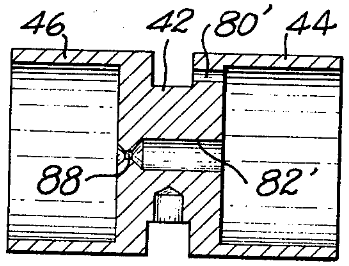
FIG. 5
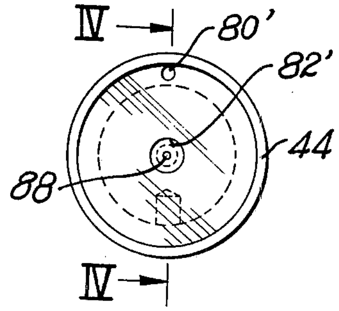

CONTROL DEVICE FOR AIR CYLINDER UNIT

BACKGROUND OF THE INVENTION

The present invention is concerned with improvements in air cylinder units and is more particularly related to improvements in control devices employed for controlling the extension and retraction of the piston and rod assembly of such units.

It is known to employ air powered cylinder units for various purpose, e.g., to use the extension operation of the unit rod and piston assembly to move or transfer an object along a conveyor on an assembly system or production line. In one such known type of unit, a control device of the type disclosed in U.S. Pat. No. 2,641,229 is used to control operation, i.e., unit piston rod and assembly extension and retraction by selectively positioning a slide member to admit pressurized fluid flow to either extend or retract such rod and piston assembly. In normal course of events operation, the said control device is well suited for its intended purpose. However, if a jam should occur on the line during the transfer operation so as to prevent the air cylinder rod and piston assembly from making its full extension stroke, the control device is not designed to prevent a potentially dangerous and undesirable operation condition. This potentially dangerous condition obtains during the extension operation because the control device piston and hence slide member are positioned or oriented for admitting air in the manner required to that end so that when an operator shuts down the air to the unit, clears the jam and reimposes air pressure to the unit, the control device piston positioning will remain the same and the rod and piston assembly will complete the previously interrupted extension operation before retraction operation can occur. If the operator has a hand in the way of the rod and piston assembly it could cause injury, or other transfer operational problems could ensue, e.g., damage to an article. Accordingly, it is desirable that such control device be designed such that upon release of air pressure from the unit as an incident attending clearing of a system jam, the control device automatically reorients its condition to effect rod and piston assembly retraction when air pressure is reimposed on the unit.

SUMMARY OF THE PRESENT INVENTION

The present invention is concerned with improvements in a control device of the type described in U.S. Pat. No. 2,641,229, the disclosure of which is incorporated herein by reference to said patent.

In accordance with the present invention, the control device is modified such that upon release of all fluid pressure therefrom during the time the rod and piston assembly of the air cylinder unit controlled thereby, the control device will automatically upon reimposition of fluid pressure orient or reposition the control device piston to the rod and piston assembly retraction operation associated position or mode thus insuring that retraction rather than extension of the rod and piston assembly will occur. In achieving this end, the control device piston which has a central head portion and skirts projecting axially in opposite directions from the central head portion is provided with fluid conveyance means therein which comprises a first passage in the central head portion having inlet thereto in communication with a pressurized fluid supply opening in the control device casing, outlet from said first passage being at a side of the piston central head portion associated with the air cylinder rod and piston assembly extension operation. A second passage is provided through the piston central head portion interconnecting the opposite sides thereof with the first passage being of greater effective cross-sectional area than said second passage. In operation, the control device of the present invention under normal operating circumstances operates like the device described in the aforementioned U.S. patent. Thus to extend the rod and piston assembly, a vent at the side of the control device associated with such operation is momentarily opened causing reduction of pressure at that side and resulting due to the pressure differential across the control device piston in travel of the piston toward that side to its position associated with rod and piston assembly extension. In normal operation and like the device of said patent, at the end of the extension operation, another vent in the control device and at the side of the device associated with retraction of the rod and piston assembly is in known manner operated to momentarily reduce pressure at the retraction associated side of the device, causing the higher pressure at the extension associated side to cause piston travel in the direction of and to the retraction associated side. However, if a jam occurs during the extension operation, e.g., leaving the rod and piston assembly in a mid-stroke position, the operator will shut down all air pressure to the unit with consequence that the control device piston will remain in its extension operation associated position. With freeing of the cause of the jam, the operator will reimpose air pressure at the unit. With this event, however, the disposition of the passage means in the control device piston central head portion will admit air under pressure first to the side of said piston associated with the extension operation. Since the pressure at the other side of the piston is quite lower, the piston will travel to its retraction operation associated position thereby insuring that following a jam and clearance thereof, the rod and piston assembly will retract and not extend. Since the cross-sectional area of the first passage is greater than that of the second, the flow of equalizing air pressure to the said retraction operation associated side of the piston head is impeded to insure initial movement of the piston out of its extension operation associated position upon reimposition of air pressure to the unit.

According to the invention, the effective cross-sectional area of the first passage in the control device piston is greater than that of the second passage in a ratio of about 6:1 to about 14:1, with a particularly advantageous ratio being about 10.4:1. In one embodiment, the first passage is inclined in the direction of the axis of the piston inwardly from the inlet thereto to outlet therefrom with the second passage extending axially through the central head portion. In another form of the piston, both the first and second passages extend in the direction of the axis of the piston.

The invention accordingly comprises the device embodying the features of construction, combination of elements, and arrangements of parts all as exemplified in the following detailed disclosure and the scope of the invention will be indicated in the claims.

BRIEF DESCRIPTION OF THE DRAWINGS

The invention will appear more clearly from the following detailed description taken in conjunction with the accompanying drawings in which FIG. 1 is a perspective view of an air cylinder unit provided with an improved control device in accordance with the principles of the present invention, parts being shown in section and broken away for purposes of clarity, the rod and piston assembly being shown in an intermediate position during the extension operation thereof, the control device position being shown in its correspondingly associated position.

FIG. 4 is a longitudinal central sectional view of a somewhat different embodiment of control device piston as taken along the line IV—IV in FIG. 5.

FIG. 5 is an end view of the piston embodiment shown in FIG. 4.

Throughout the following description like reference numerals are used to denote like parts in the drawings.

DESCRIPTION OF THE PREFERRED EMBODIMENTS

Figure 2:
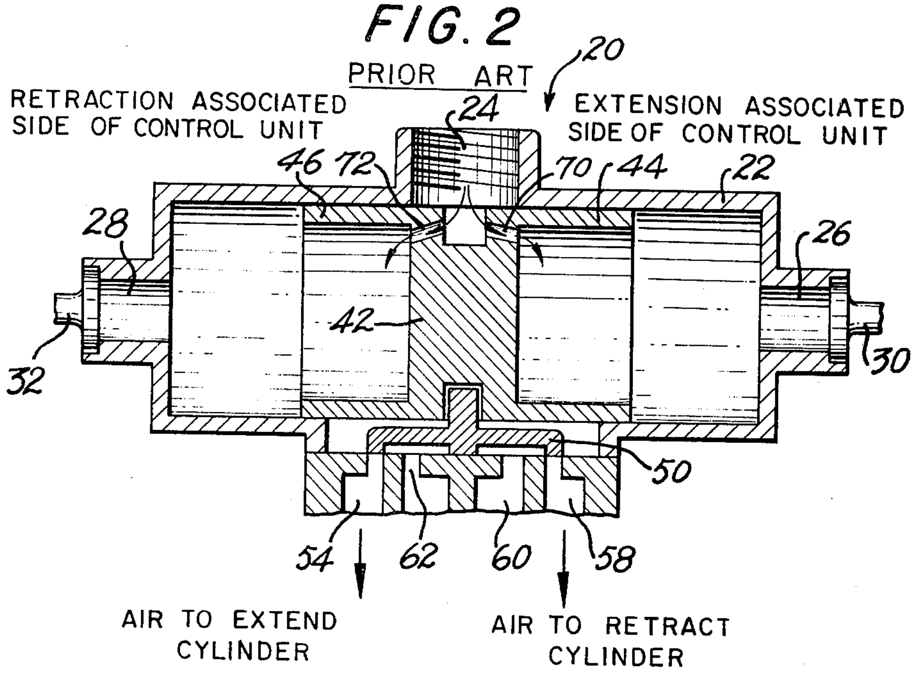
FIG. 2 PRIOR ART
FIG. 2 is a schematic depiction embodying the constructional and operational principles of a prior art control device of the type disclosed in U.S. Pat. No. 2,641,229, the depiction being of a longitudinal central sectional view of such device, the device piston being in an intermediate position between the two extreme positions in which it operates.

As mentioned above, the present invention is concerned with improvements in air cylinder units and specifically in those that use in conjunction therewith a control device of the type described in U.S. Pat. No. 2,641,229. As a preliminary, brief discussion will be had of the construction of such type of air unit as well as the construction and operation of the control device for which purpose reference is made to FIGS. 1 and 2 of the drawings. The air cylinder unit 10 includes a cylinder 12 in which reciprocate in extension and retraction strokes, a rod 14 and piston 16 assembly. For controlling operation of the rod and piston assembly, a control device 20 is mounted at one end of cylinder 12, the particular device depicted in FIG. 1 being in all respects of known construction, e.g., as described in U.S. Pat. No. 2,641,229, and shown schematically in FIG. 2, except that the piston therein is modified according to the present invention. Control device 20 includes an elongated casing 22 having a pressurized fluid supply opening 24 in a side wall thereof and exhaust vents 26,28 at opposite end walls of the casing, there being means such as bleeder valves 30, 32 respectively, for opening and closing said vents (FIG. 2), bleeder valve 30 being controlled by operation of solenoid unit 34 in known manner through electrical connection 36 with bleeder valve 32 also being controlled in known manner by mechanical control linkage 38 connected to the bleeder valve 32 and rod 14, the last-mentioned connection being by bracket 40 only a portion of which is shown.

Control device 20 also includes a piston disposed within casing 22 for reciprocating movement between positions associated with retraction operation of the rod and piston assembly and extension operation of said assembly, the FIG. 1 position of said piston being that associated with extension operation. The control device piston includes a disc-like central head portion 42 and radially larger skirts 44, 46 projecting axially in opposite directions from the central head portion 42, with the space enclosed by each skirt as well as the face of the head portion adjacent thereto being in fluid communication with an associated exhaust vent 26, 28. A slide member 50 is connected to the control device piston for movement therewith between two port means covering positions on block 52 for controlling air delivery to the cylinder 12. With the slide member 50 in the position depicted in FIG. 1, pressurized air entering unit 20 in addition to actuating or moving the control device piston also flows around the periphery of piston central head portion 42 and enters the port and passage as at 54 and is communicated to the top side of piston 16 to stroke it downwardly in an extension operation. At the same time, due to the positioning of slide member 50, air at the under side of piston 16 is forced out through passage 56, into ported passage 58 and outwardly through passage 60 to exhaust. During the extension operation ported passage 62 serves no function. At the end of the extension travel of rod 14, control linkage 38 opens vent 28 momentarily and because a pressure differential now exists across the opposite faces of central head portion 42 the higher pressure at the right side of the head portion shifts the said piston from its extension operation associated position leftwardly to its retraction operation associated position. In the last-mentioned position, the control device positions slide member 52 such that passage 54 communicates with passage 62 to exhaust air from the top side of piston 16 while at the same time pressurized air flows through passage 58 to retract the rod and piston assembly, passage 60 in this operation serving no function. At the end of the retraction operation, solenoid 34 is energized and vent 26 momentarily is opened to create a pressure differential to slide the control device piston to the right and commence a new cycle of unit operation.

FIG. 2 depicts schematically the prior art control device 20 which would not function to orient the device to a retraction operation associated position in the event unit air pressure was released during a jam in the extension operation followed by reimposition of such air pressure. This control device piston uses a ball member (not depicted herein but shown in detail in U.S. Pat. No. 2,641,229) to control air flow to the opposite faces or side of the piston. Such flow is shown schematically as occurring through flow courses 70, 72. Thus, if the piston were in its extension operation associated position, it would be at its right hand extreme travel position and air under pressure would flow through passage 54. When system or unit air was shut down to clear a jam, all pressure would release back through opening 24. When air pressure was reimposed at opening 24, and with the control device piston in its right hand position, pressure would build up equally at both sides of the piston so that the absence of a pressure differential would result in the piston remaining in the position it occupied at shut down. This in turn would result in full pressure supply to extend the rod and piston assembly.

Figure 3:
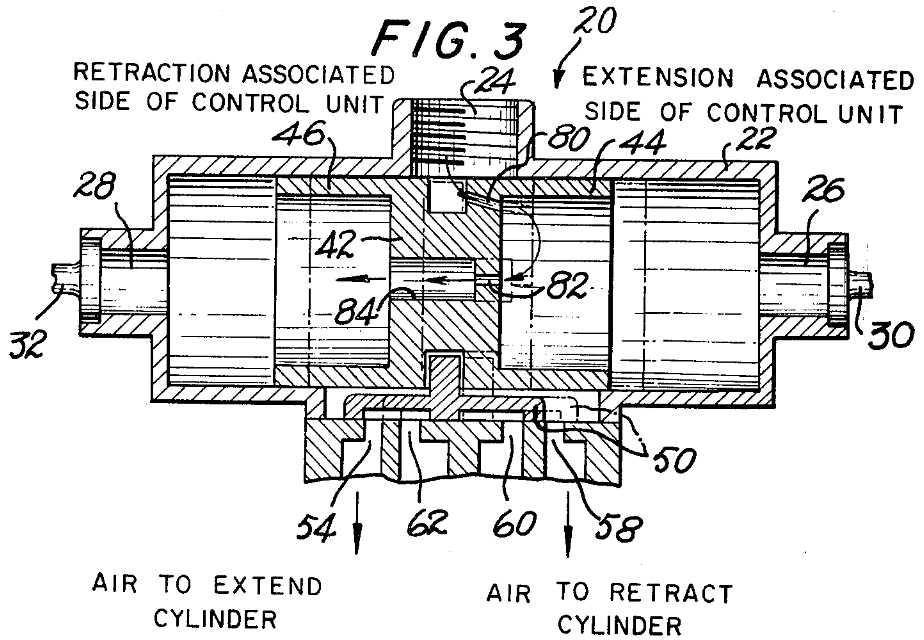
FIG. 3 is a view similar to FIG. 2 except it depicts the manner in which the control device piston is modified according to the present invention, the said piston being shown in its rod and piston assembly retraction operation associated position.

FIG. 3 on the other hand shows the improvement in the control device provided by the present invention. The piston of said device instead of having a ball member valve means is provided with a first passage 80 disposed in the central head portion 42 at the side of said head portion associated with extension operation of the rod and piston assembly and adjacent skirt 44. Inlet to said passage 80 is in communication with fluid supply opening 24 and outlet therefrom is at said head portion side. A second passage 82 extends through head portion 42 interconnecting the two opposite sides thereof. The effective cross-sectional area of passage 80 is greater than that of passage 82. In fact the ratio of the area of passage 80 to that of 82 is on the order of about 6:1 to about 14:1, a particularly advantageous ratio being about 10.4:1. Because all air pressure to the control unit must pass first through passage 80 at the extension operation associated side of inch in unit it thereby is possible to automatically move the piston to its rod and piston assembly retraction operation position if fluid pressure be released and subsequently reimposed on the unit. Then if during an extension operation, the rod and piston assembly encounters a jam, the operator will turn off the air to the unit, the piston then being in and remaining in its right hand position as depicted in long and short dashed lines even though all air vents from the unit through opening 24 inasmuch as no pressure differential has existed from shut down onwards as could alter the piston position. However, when air pressure is reimposed on the unit, air first passing through passage 80 will initiate leftward movement of the piston and even though air passes through passage 82 also, the pressure to the left side of the piston is not as high as that at the right with the resulting differential causing displacement of the piston to its retraction associated position which is shown in solid lines. Even though during the events which follow reimposition of air pressure, there is a moment when with the piston in its right hand position there is communication of air under pressure to port 54, the effect of pressure at the right side of the control device piston is so pronounced that in an actual installation, there has occurred only a maximum rod and piston assembly travel of ¼ in the extension direction before the control device becomes fully reoriented for retraction. During normal operation of the control device and when the piston moves from retraction to extension associated positions upon venting through vent 26, the fact that all air enters at the right side of the piston first, does not prevent full travel to the extension position because the $\Delta P$ between the two sides is not enough to start the piston travelling leftward before the full extension stroke of the rod and piston assembly is effected and vent 28 opened.

In the piston embodiment depicted in FIG. 3 passage 80 is inclined in the direction of the axis of said piston inwardly from inlet thereto to outlet therefrom. Passage 82 can extend centrally axially through the piston central head portion and can enlarge as at 84, such enlargement being an incident of first drilling a large hole through the head portion and then the smaller dimension hole, since it is difficult to drill a hole only 0.013 inch in diameter through a head portion thickness of about ¾ inch.

FIGS. 4 and 5 show a somewhat different form of control device piston in which both first passage 80′ and second passage 82′ extend in the direction of the piston axis. Passage 82′ is provided with a constricted portion as at 88 which defines the effective cross-sectional area thereof. In practice, passages 80 and 80′ have a diameter of about 0.042 inch, whereas, passage 82 and the constricted segment 88 of passage 82′ have a diameter of about 0.013 inch.

What is claimed is:

1. In a double acting air cylinder unit including a cylinder, a rod and piston assembly movable in said cylinder between retracted and extended positions, a separate air passage means associated with each of the extension and retraction operations of said rod and piston assembly for conveying air under pressure to opposite sides of said piston and exhausting air therefrom, each of said air passage means having a port at the point of entry thereto, exhaust means and a inlet-exhaust slide valve member movable between each of two port covering positions to close off the air passage means associated therewith to flow of air under pressure and permitting exhaust therefrom to said exhaust means during the respective extension and retraction operations of said rod and piston assembly, and a control device operative to move said slide valve member between said two port covering positions, said control device comprising an elongated casing having a pressurized fluid supply opening in a side wall thereof and exhaust vents at opposite end walls of said casing, and means for opening and closing said vents, a control piston disposed in said housing for sliding reciprocating movement therein between two extreme operating positions, one position being associated with retraction operation of said rod and piston assembly and the other being associated with extension operation of said rod and piston assembly, said control piston including a central head portion and skirts projecting axially in opposite directions from said central head portion, the space enclosed by each said skirt being in fluid communication with an associated exhaust vent, said control piston central head portion having passage means for communicating fluid under pressure from said supply opening to said inlet-exhaust slide valve member and fluid conveyance means therein for communicating fluid under pressure from said fluid supply opening to opposite sides of said central head portion, one of said opposite sides facing the extreme operating position of said central piston associated with the retraction operation of said rod and piston assembly and the other of said opposite sides facing the extreme operating position of said control piston associated with the extension operation of said rod and piston assembly, said control piston being caused to slide between its respective rod and piston assembly retraction and extension operation associated positions in said casing by a fluid pressure differential across the opposite sides of said central head portion produced when one of said exhaust vents is opened, the improvement in said control device for automatically moving said control piston to its rod and piston assembly retraction operation associated position if all fluid pressure be released from said unit during the time said rod and piston assembly is extending, characterized in that said fluid conveyance means comprises a first passage in said control piston central head portion having inlet thereto in communication with said casing fluid supply opening and outlet therefrom at only the side of said control piston central head portion open to the next means associated with said rod and piston assembly extension operation position, and a second restrictive flow passage solely extending entirely through said control piston central head portion interconnecting the opposite sides thereof, said first passage being of greater effective cross-sectional area than said second passage, whereby upon reimposition of fluid pressure at said casing fluid supply opening pressurized fluid will flow in said control unit so as to produce a higher fluid pressure at the side of said control piston central head portion associated with said extension operation position than at the other side, said pressure differential causing said control piston to slide toward its rod and piston assembly retraction operation associated position.

2. The air cylinder unit of claim 1 in which the ratio of the effective cross-sectional area of said first passage to that of said second passage is of a value within a range of ratios of about 6:1 to about 14:1.

3. The air cylinder unit of claim 2 in which the ratio of the effective cross-sectional area of said first passage to that of said second passage is about 10.4:1.

4. The air cylinder unit of claim 1 in which both the inlet and outlet of said first passage is disposed in said control piston central head portion adjacent the skirt projecting axially from the side of said portion associated with said rod and piston assembly extension position.

5. The air cylinder unit of claim 4 in which said first passage is inclined in the direction of the axis of said control piston inwardly from inlet thereto to outlet therefrom, said second passage extending axially through said central head portion.

6. The air cylinder unit of claim 4 in which said first passage and said second passage both extend in the direction of the axis of said piston.

* * * * *

UNITED STATES PATENT OFFICE

CERTIFICATE OF CORRECTION

PATENT NO. : 3,949,646

DATED : April 13, 1976

INVENTOR(S) : George W.B. Taylor

It is certified that error appears in the above-identified patent and that said Letters Patent are hereby corrected as shown below:

In claim 1, Col. 6, line 66, "next" should read --vent--.

Signed and Sealed this

*Seventeenth* Day of *October 1978*

[SEAL]

*Attest:*

RUTH C. MASON
*Attesting Officer*

DONALD W. BANNER
*Commissioner of Patents and Trademarks*